Oct. 28, 1958

N. RAPPAPORT 2,857,992

LIQUID COOLED AND LUBRICATED ROTARY BRAKE

Filed April 20, 1956

Inventor:
Nathan Rappaport
by: J. Delattre Segry
Attorney

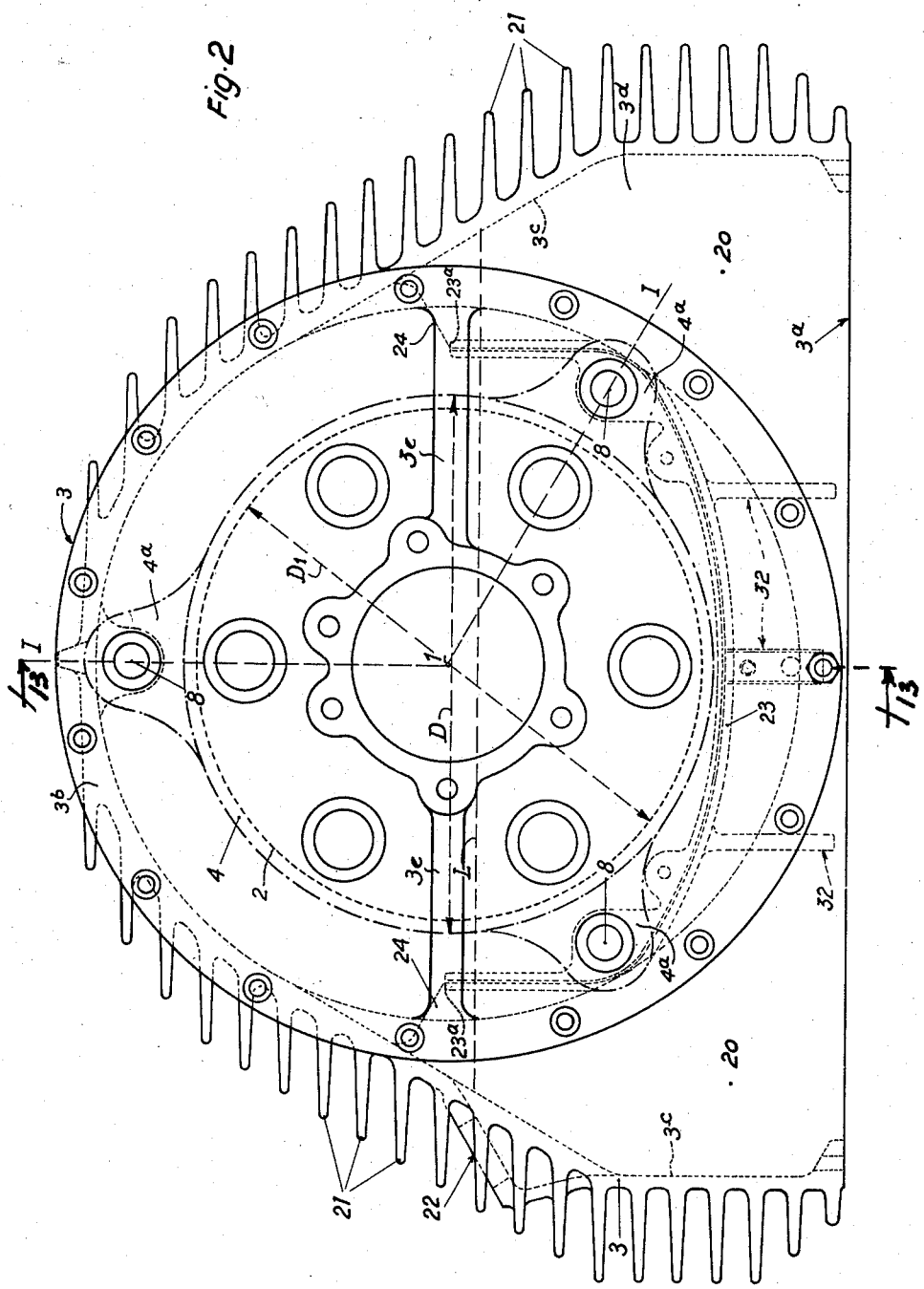

Oct. 28, 1958
N. RAPPAPORT
2,857,992
LIQUID COOLED AND LUBRICATED ROTARY BRAKE
Filed April 20, 1956
4 Sheets-Sheet 3
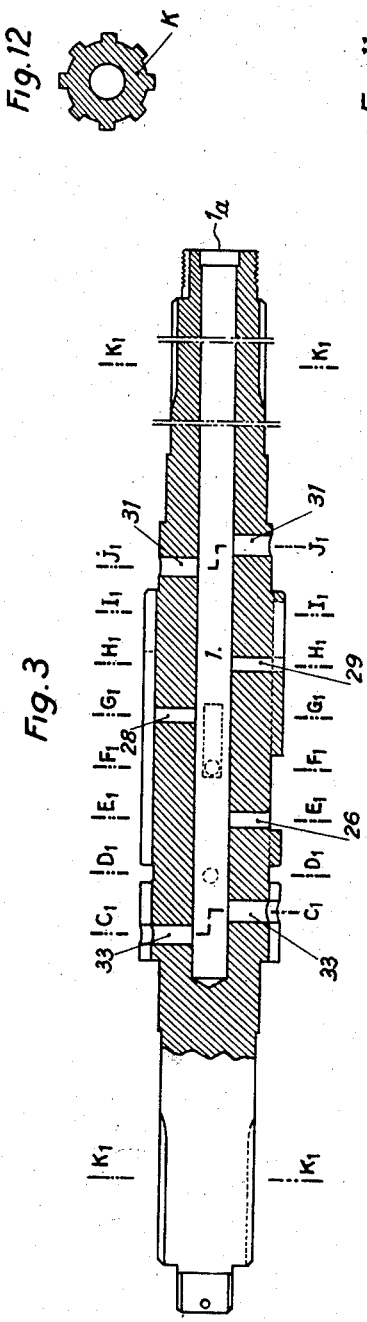

United States Patent Office 2,857,992
Patented Oct. 28, 1958

2,857,992

LIQUID COOLED AND LUBRICATED ROTARY BRAKE

Nathan Rappaport, Paris, France

Application April 20, 1956, Serial No. 579,597

Claims priority, application France September 1, 1955

7 Claims. (Cl. 188—264)

This invention relates to a slowing down device and particularly to a slowing down device for automobile vehicles based on the known principle of the longstanding multi-disk clutches. It is most useful on heavy vehicles the brakes of which wear out rapidly, over-heat, and soon become unserviceable.

This slowing down device may also be used with all shafts, winch rollers, etc., which one desires to brake smoothly with maximum effectiveness (shafts of stationary motors, of marine engines, braking of airplanes on the ground, etc.).

This slowing down device is essentially characterized by a series of moving disks fixed on the power shaft (preferably close to the gear-box) and of stationary disks inserted between the moving disks, the said stationary disks being integral with a box fastened to the chassis; by means of a special control the said stationary disks may be made to come into contact with the moving disks, the whole of the stationary and moving disks operating in a fluid oil bath.

The oil bath is contained in the aforesaid box, which also encloses the moving disks and that portion of the length of the power shaft, bearing the moving disks, between the gear-box and the universal joint to which the shaft is connected at its ends. As another feature, the special control of the stationary disks may be actuated by the vehicle driver through the motion and rotation of the axle of the clutch.

The moving disks are made, for instance, of polished steel; the stationary disks are made, for instance, of a polished core faced, for instance, with copper-coated Phosphor bronze plates fastened to the core by means of rivets with countersunk heads. To permit effective lubrication the moving disks may preferably be provided with spiral grooves which collect oil at the periphery and convey it towards the centre. Moreover, oil channels bored through the power shaft permit oil to be projected between the disks to increase the cooling effect thereon.

As another feature, the power shaft comprises a central longitudinal bore; and its walls comprise radial oil channels facing the disks between the moving and stationary disks, and additional radial channels located on the length of the shaft beyond that portion of said length which carries the moving disks. The oil bath circulates from a reservoir at the bottom of the box up to and through the central bore of the shaft and out and between the moving and stationary disks, by means of the several radial channels, to the periphery of the box, and down to the reservoir. This closed circulation of the oil is obtained by the effect of the centrifuge and other forces due to the rotation of the power shaft.

The foregoing and other features will appear from the following description and attached drawings, given by way of illustration and not of limitation.

In the drawings:

Figure 2 is a vertical side view of the device.

Figure 3 is a detailed longitudinal cross-section of the power shaft 1.

Figures 4, 5, 6, 7, 8, 9, 10, 11 and 12 are transverse cross-sections of the power shaft taken respectively along lines $C_1$, $D_1$, $E_1$, $F_1$, $G_1$, $H_1$, $I_1$, $J_1$, and $K_1$ shown on Figure 3.

on Figure 2.

Figure 1:
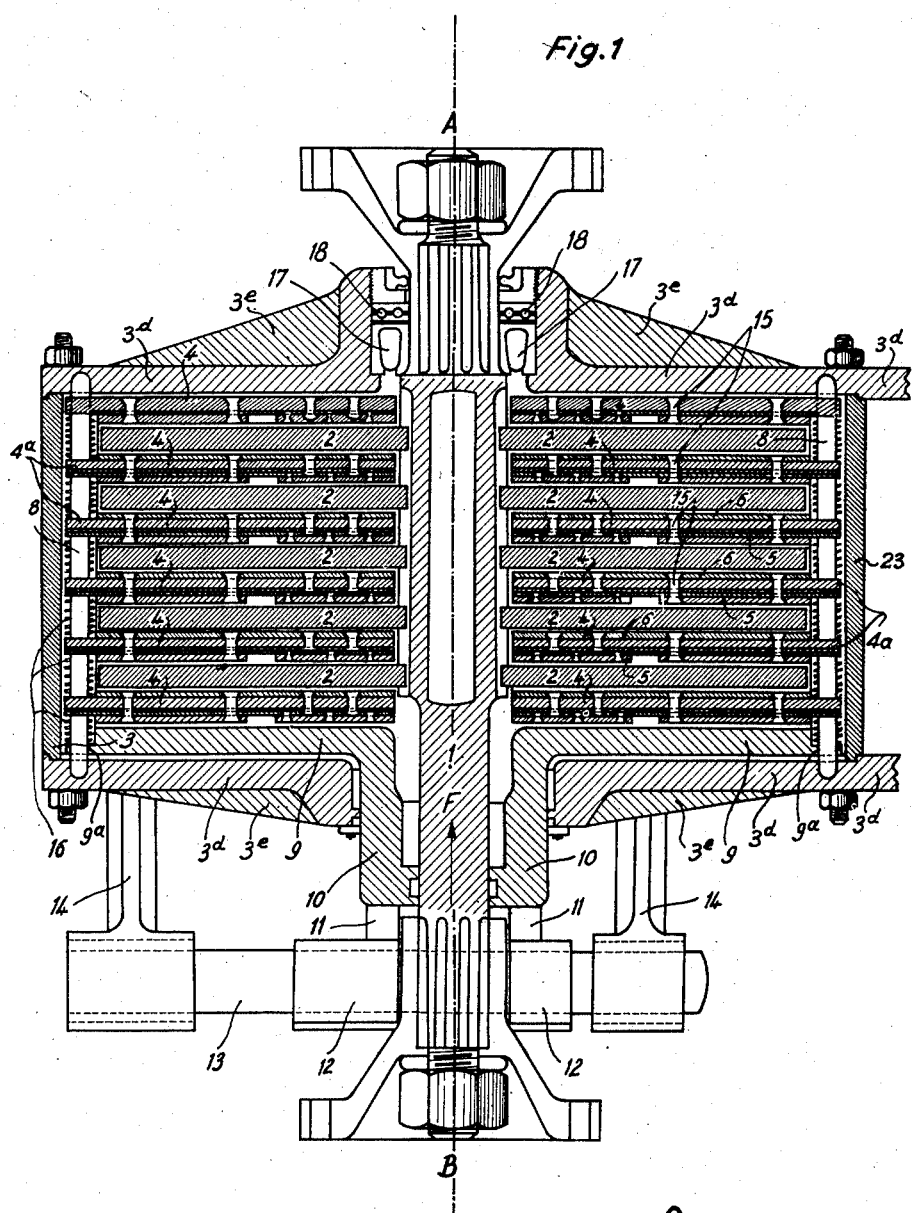
Figure 1 shows the slowing-down device partly in cross-section, taken along line I—I of Figure 2.

As shown in the drawings, a power shaft 1 of the vehicle is disposed between the rear of the gear-box A and the fore of a universal joint B, and between said gear-box A and joint B, over a predetermined portion of its length, it carries a series of fastened moving disks 2 which are circular in their periphery; Fig 1 shows five of such moving disks 2 by way of illustration. It appears from Fig. 1 that the plane of each moving disk 2 is at right angle to the axis of power shaft 1. In the drawings, the power shaft 1 is illustrated as a horizontal shaft, so that the planes of the attached moving disks 2 may be stated to be vertical. However it is obvious that, alternatively, the power shaft may be vertical or at an angle respective to the vehicle, the moving disks 2 remaining in any case at right angle to the axis of the shaft 1. In the following description it will be assumed that the power shaft 1 is horizontal.

Moving disks 2 are fixed to the working part of the shaft 1, shown at $E_1$—$I_1$ in Figure 3, as a result of the splined profile of this portion of the shaft (see Figures 3, and 6 to 10). Moving disks 2 are fixed on shaft 1 at regularly spaced intervals in order to accommodate in each said interval one of a series of stationary disks 4 (see Figure 1) attached concentrically of shaft 1 to the box or casing 3 enclosing the slowing device, as will be more fully described hereafter.

The central plate or core 4 of the stationary disks is faced on both sides with friction plates 5 and 6. The friction plates 5, 6 are fastened to the core 4 of the stationary disks by means of rivets 15 having a countersunk head (Figure 1).

The contour of the stationary disks is shown in Figure 2; it comprises a circular portion which is extended outwardly at regular intervals by projections 4a which may be integral with the circular portion, or fixed thereto by any suitable means such as welding. Three such projections are illustrated in Figure 2, but any desired number may be used. These extensions serve to connect the stationary disks to the box or casing 3 as explained hereafter.

As shown in Figures 1 and 2, the diameter $D_1$ of moving disks 2 is not in excess of, and preferably very slightly smaller than, the diameter D of the circular portion of the stationary disks.

The moving disks 2, the stationary disks 4 and their projections 4a, and that portion of the shaft 1 bearing moving disks 2 and serving to their lubrication are enclosed in a box or casing 3 attached in any known manner to the chassis of the vehicle, for instance by its base 3a (Fig. 2); this casing 3 comprises a cover portion 3b of substantially circular profile, the radius of which is great enough to encase the stationary disks 4 including their extensions 4a; this cover portion 3b fits over the upper portion of the slowing device (Fig. 2) and is prolonged toward the base 3a by walls 3c flaring outward symmetrically from both sides of the disks. It must be understood that the cover portion 3b and the flaring portions 3c are connected to base 3a by side walls 3d (Figure 1) or flanges of similar nature in order that casing 3 forms a fluid tight box enclosing the shaft 1, the moving disks 2 and the stationary disks 4 and 4a. Circular side flanges 3e concentric with the axis of shaft 1 are provided to reinforce the side walls of casing 3 (Fig. 2) and the diameter of said reinforcing flanges is sufficiently great so that they encompass the projections 4a of the stationary disks.

The stationary disks 4 are connected to the casing 3 as follows: each of the projections 4a of each disk 4 is perforated to engage stationary rods 8 which are held in place by engagement with side walls 3d of the casing 3, inside the latter and inside the circles defined by the reinforcing flanges 3e (Figs. 1 and 2). The application of the stationary disks 4 against the moving disks 2 is effected by means of a thrust plate 9 surrounding shaft 1 adjacent an inside one of the side walls 3d of the casing, said side wall being so spaced from the stationary disks as to permit the insertion of said thrust plate 9; moreover the periphery of said thrust plate 9 is slotted at regular intervals corresponding to the spacing of projections 4a and rods 8, to engage said rods 8 slidingly as shown at 9a (Fig. 1); the central part of thrust plate 9 immediately surrounding shaft 1 may take the shape of cup shaped extension 10 extending outside casing 3; the spacing between thrust plate 9 and the stationary plates or disks 4 and between two adjacent stationary disks is obtained by means of sets of calibrated coil-springs 16 set around rods 8 as shown in Fig. 1; therefore an axial small displacement of thrust plate 9 is adapted to compress springs 16 and to move the stationary disks 4 into contact with the moving disks 2 to secure the desired slowing-down effect; a small displacement of thrust plate 9 in the opposite direction, away from the stationary disks 4 will release the moving disks 2. These displacements of thrust plate 9 are obtained, as shown in Figure 1, by means of two cams 11 engaging the central extension 10 and which are mounted on collars 12 of a control shaft 13; said control shaft 13 may be held by brackets 14 fastened to casing 3; it is understood that, in that embodiment, the assembly of parts 11, 12 and 13 is offset and away from shaft 1, although other forms serving the same purpose may be used without departing from the scope of the invention. Collars 12 are fixed on shaft 13 which may be the axle of the clutch pedal of the vehicle or which may be actuated by the driver through any known controlling devices (levers, hydraulic or pneumatic control, etc..).

In order to permit a slight thrust play between the box or casing 3 and the central shaft 1, for instance if the thrust of plate 9 is slightly to strong against springs 16, a roller bearing 17 and a ball thrust-bearing 18 may be provided between the box 3 and the shaft 1 on the side of the box and of the shaft opposite to the side of the casing in which thrust-plate 9 is located (Figure 1).

Figure 13:
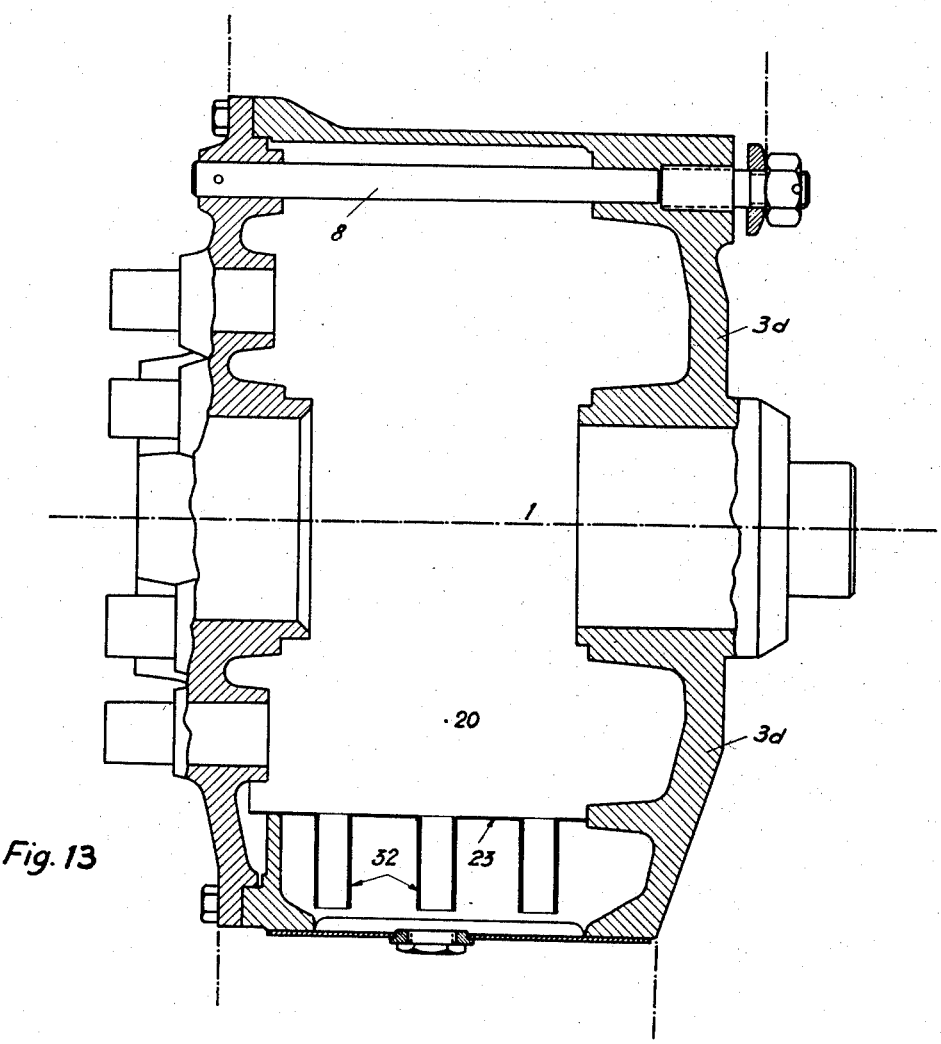
Figure 13 is a section taken vertically of Figure 2 in a plane passing through the axis of power shaft 1, as indicated by section indicators $$\xrightarrow{\phantom{x}/13\phantom{x}}$$

The walls 3b and 3c of the casing 3 are provided with cooling fins 21. As shown in Fig. 2, the lower portion of the box or casing 3 forms a large tank 20 adapted to receive and hold lubricating oil; the oil is introduced into tank 20 through wall plug 22. Surrounding approximately the lower half of the stationary and moving disks, which form the slowing-down device proper, there is disposed an oil pan 23, secured to the opposite side walls of the casing in any suitable manner, and the bottom of which is immediately below the lower part of the periphery of the disks (see Figures 1, 2 and 13). The top edges 23a of oil pan 23 are at some distance from the cover walls 3c of the casing, providing for oil overflow and communicating channels 24 between the upper portion of the disks and the tank 20. The bottom portion of pan 23 is in open communication with the lower part of tank 20 by means of a number of suction-pipes 32, three of which are shown in Fig. 2. The tank 20 and the pan 23 are preferably filled with lubricating oil up to about the level L (Fig. 2) so as to cover the lower part of the stationary and moving disks up to about the bottom of shaft 1, or higher if necessary.

As a result of this arrangement, the lower half, or a substantial part thereof, of the stationary disks is always bathed in oil; as the power shaft 1 and the moving disks 2 rotate, there is always a portion of the shaft and of said moving disks which comes in contact with the oil contained in pan 23; thus, the shaft 1, stationary disks 4 and moving disks are subjected to a cooling action. As a result of the rotation of the shaft 1 and moving disks 2, a substantial portion of the oil contained in pan 23 is lifted and projected upwards into the upper part of the casing, some of it against its walls; this portion of the oil, which has become hot, falls back into tank 20 through channels 24; in tank 20, it is cooled; then that portion of the oil is replaced in pan 23 by cool oil from tank 20 through suction-pipes 32 by the syphoning effect caused by the rotation of the moving blades 2. Of course, some of the oil projected upwards may fall back into the oil pan 23 through the small intervals between the stationary disks 4 and the moving disks 2 when the stationary disks are not placed in contact with the moving disks for slowing-down action.

As shown in Figure 3, power shaft 1 is centrally bored along its longitudinal axis; the length of said bore is greater than the length of that portion of the shaft which carries the moving disks 2; as stated, Fig. 1 shows five moving disks; those are carried by the shaft at regular equidistant intervals, and, by reference to Figure 3, are located between the transverse planes (six) designated as $D_1$, $E_1$, $F_1$, $G_1$, $H_1$ and $I_1$; on the contrary, the stationary disks 4 have their median planes coinciding substantially with said six transverse planes. The transverse cross-sections of the shaft 1 on said six transverse planes are shown in Figures 5 to 10, and it is seen that at each of these cross-sections, the wall of the shaft comprises a radial channel (25 to 30) which extends from the central bore to the outer surface of the shaft 1; thus the median plane of each of these six channels coincides substantially with the median plane of a stationary disk. Moreover, shaft 1 comprises, as shown at $C_1$ and $J_1$ (Fig. 3) and in Figures 4 and 11, two additional sets of radial channels 33 and 31 each extending from the central bore to opposite sides of the outer surface of the shaft 1, and located outside the series of moving and stationary disks. The length of that portion of the shaft which includes channels 25 to 31 and 33 is such that said portion and said channels dip to some extent in the oil contained in pan 23. The bore is closed at both ends, either by the stock itself of the shaft, as shown at the left of Fig. 3, or, as would be used at the right end 1a (Fig. 3), by any suitable closure means, not shown. Channels 25 to 30 are radially angularly offset relative to each other, so that they open at different points of the periphery of the shaft. As a result of this arrangement, oil from pan 23 is sucked, during rotation of shaft 1, through channels 33 and 31 into the closed bore, and is ejected through channels 25 to 30 between the stationary disks and the moving disks, increasing their cooling, already partly effected by the fact that their lower half dips in the oil in pan 23 as heretofore described. A portion of the oil so ejected falls back into the pan 23, the other portion is projected into the upper portion of casing 3, from which it returns to tank 20 through channels 24.

What is claimed is:

1. A slowing-down device for automotive vehicles, comprising in combination: a stationary box-shaped casing having a bottom wall, side walls and a cover wall; a rotary power shaft traversing said casing through said side walls; moving disks carried on a longitudinal portion of said shaft; non-rotating disks connected to said casing and interleaved between said moving disks; in said casing, an oil-containing pan adjacent and surrounding the periphery of the bottom half of said disks, and extending between said side walls of said casing, whereby the bottom half of said disks and the bottom portion of said shaft dip continuously in the oil in said pan; in said shaft, a central axial longitudinal bore closed at both its ends; the length of said bore being greater than said longitudinal portion of said shaft; in the walls of said shaft a first set of radial channels connecting said bore with the outer surface of said shaft, each of said channels of said first set having its median plane coinciding substantially with the median plane of one of said non-rotating disks; in the walls of said shaft, a second set of radial channels connecting said bore with the outer surface of said shaft, said second set being located in the walls of said shaft outside of said moving disks carrying longitudinal portion of said shaft; whereby, upon rotation of said shaft, oil enters and fills said bore from said pan through said second set of radial channels, and is projected and ejected from said bore through said first set of radial channels between said moving disks and said non-rotating disks.

2. A device as claimed in claim 1, comprising further: in said casing, an enlarged oil-receiving and-cooling lower section.

3. A device as claimed in claim 2, comprising further: in said casing, means to return oil projected into the upper portion of said casing to said enlarged lower section and to said pan.

4. A device as claimed in claim 3, in which said means comprise a third set of channels between said casing and said pan and connecting said upper portion of said casing with said enlarged lower section, and oil-suction tubes connected to the lower portion of said pan and having their bottom opening near the bottom wall of said casing.

5. A device as claimed in claim 1, comprising further: on each of said non-rotating disks, a plurality of similar radial extensions equally spaced on the periphery of said disks; a hole in each of said extensions; between the side walls of said casing, a plurality of equally spaced rods having their ends set in said side walls and located outside the periphery of said non-rotating disks, each of said rods engaging the hole in one extension in each of said non-rotating disks; and on each of said rods, resilient spacing means between two adjacent extensions.

6. A device as claimed in claim 5, in which said resilient spacing means consist in calibrated coil springs concentric with said rods and adapted to space said extensions and non-rotating disks.

7. A device as claimed in claim 6, further comprising: spring-actuating means located adjacent the inner surface of one side wall of said casing and engaging said coil springs; said spring-actuating means having a central cup-shaped extension concentric with said power shaft and projecting through and outside said one side wall; and control means outside said casing cooperating with said cup-shaped extension for moving said spring-actuating means longitudinally of said shaft; whereby, upon operation of said control means, said spring-actuating means moves inward in said casing and compresses said coil springs to move said extensions and non-rotating disks along said rods towards the opposite side wall of said casing and to effect slowing-down contact of each non-rotating disk with an adjacent moving disk, and, upon release of said control means, said spring-actuating means move back toward the said inner surface, decompressing said coil springs, to separate each non-rotating disk from said adjacent moving disk and to terminate said slowing-down contact.

References Cited in the file of this patent

UNITED STATES PATENTS

| | | |
|---|---|---|
| 1,174,678 | Carpenter et al. | Mar. 7, 1916 |
| 1,380,584 | Parker | June 7, 1921 |
| 2,620,900 | Du Rostu | Dec. 9, 1952 |
| 2,690,248 | McDowall | Sept. 28, 1954 |